April 4, 1950 D. S. JONES ET AL 2,502,851
MILLING MACHINE ATTACHMENT FOR TURNING LATHES
Filed Nov. 19, 1946 2 Sheets-Sheet 1
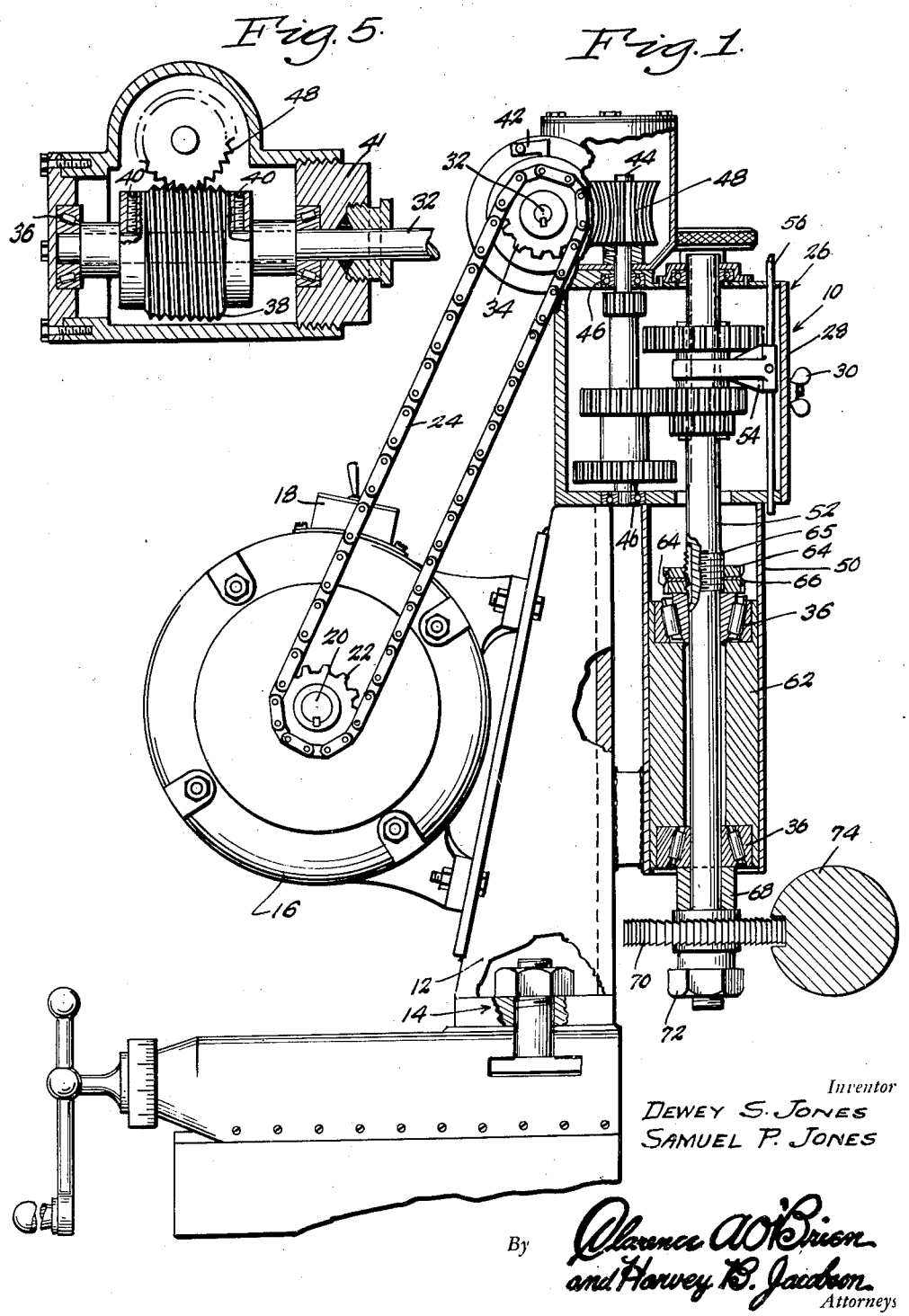
Inventor
DEWEY S. JONES
SAMUEL P. JONES
By *Clarence A. O'Brien
and Harvey B. Jacobson*
Attorneys April 4, 1950     D. S. JONES ET AL     2,502,851
MILLING MACHINE ATTACHMENT FOR TURNING LATHES
Filed Nov. 19, 1946     2 Sheets-Sheet 2
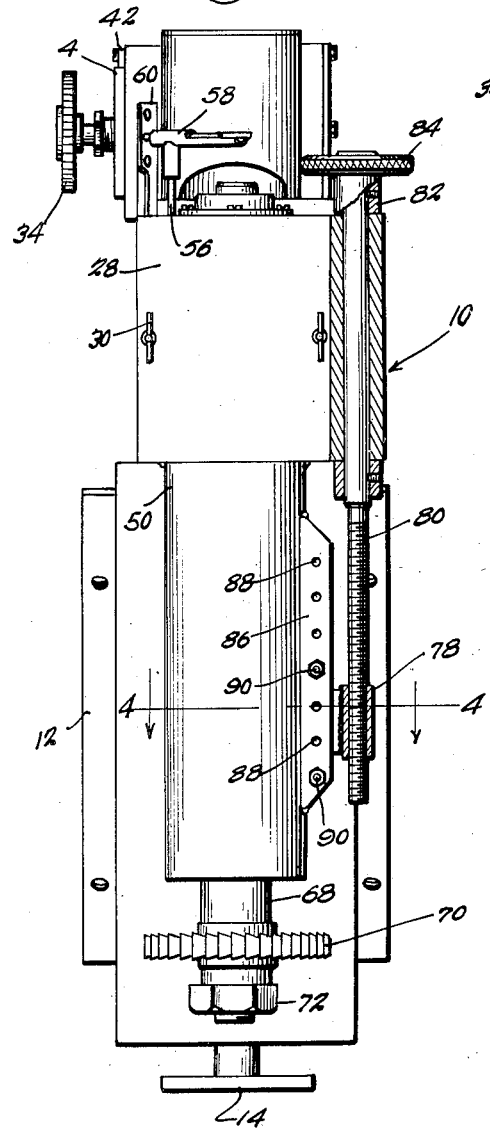
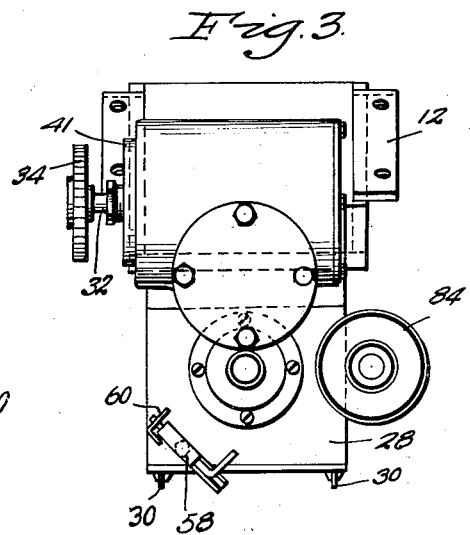
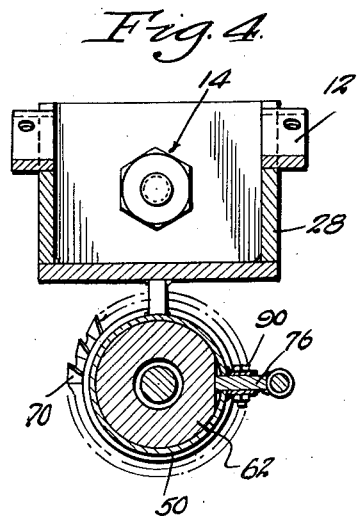
Inventor
DEWEY S. JONES
SAMUEL P. JONES
By *Clarence A. O'Brien*
and *Harvey B. Jacobson*
Attorneys Patented Apr. 4, 1950

2,502,851

UNITED STATES PATENT OFFICE 2,502,851

MILLING MACHINE ATTACHMENT FOR TURNING LATHES

Dewey S. Jones and Samuel P. Jones, Shelby, N. C.

Application November 19, 1946, Serial No. 710,906

2 Claims. (Cl. 90—16)

This invention relates to an improved device attachable to lathes for performing milling operations.

An object of this invention is to provide an accurate and efficient milling attachment adapted to be used with a conventional lathe.

Another object of this invention is to provide a structure which is readily attachable and detachable from its operative position.

A further object of this invention is to provide a device of the character described capable of a variety of cutting operations.

A still further object of this invention is to provide a device capable of cutting keyways on different angles, cutting gears including bevel gears and cutting splines.

A still further object of this invention is to provide screw means for effecting very fine adjustment of the cutter.

Other objects and features of novelty will be pointed out specifically or will become apparent in following the description of the included drawings, wherein:

Figure 1 is a side view of the instant invention shown partly in elevation and partly in section;

Figure 2 is a front view of the present invention shown mostly in elevation and having parts broken away in section;

Figure 3 is a plan view of Figure 2;

Figure 4 is a sectional detail of construction taken substantially on the line 4—4 of Figure 2 and in the direction of the arrows, and Figure 5 is an enlarged sectional detail of a portion of the transmission used in the present invention.

Referring now in detail to the instant invention for a complete understanding of a preferred embodiment thereof, similar reference characters are used throughout the views of the invention to designate like parts.

The reference numeral 10 is used to designate the invention in general terms. As seen in Figure 1, a stand 12 is adapted to be secured to the cross-feed of a lathe by a conventional means 14. Secured to the said stand 12 is a power unit 16 having a suitable switch 18 secured thereon and having a drive shaft 20 projecting therefrom. Keyed to the said drive shaft 20 is a sprocket 22 adapted to receive a sprocket chain 24 therearound.

Secured to, or forming a continuation of the stand 12 is a gear box 26 having a removable end plate 28 preferably secured by wing nuts 30 as shown. At the upper end of the said gear box and rotatably received therein is a driven shaft 32 having a sprocket 34 suitably keyed thereto which is adapted to receive the driving chain 24. As seen best in Figure 5 the said shaft 32 is journaled in suitable roller bearings 36 and has a suitable gear 38 secured thereon preferably by the set screws 40, as shown in the drawings. A conventional "Timkin" bearing 41 is provided at the sprocket end of the said shaft 32 and the conventional adjusting sleeve is locked by the pin 42 in the usual manner.

Referring now to Figure 1, a first shaft 44 is suitably journaled in conventional bearings 46 and has rigidly secured thereto a worm gear 48 adapted to mate the hereinbefore described gear 38. Also secured on the said shaft 44 is a gear cluster comprising a first, second and third gear, each having a larger number of teeth respectively.

Suitably secured to said gear box 26 is a sleeve 50 having a shaft 52 rotatably secured therein. The said shaft 52 extends into the said gear box and has a cluster of three gears slidably keyed thereon. An arm 54 is secured to the said gear cluster having a rod 56 projecting through the gear box terminating in a suitable bayonet latch which cooperates with an apertured plate 60 for selective locking thereof. As is quite evident from an inspection of Figure 1 the said rod 56 may be pulled and latched in one of a selected group of positions thereby shifting the last-mentioned gear cluster to engage selective gears with the first-mentioned gear cluster. By this means the driving gear ratio is obviously changed thereby producing resultant changes in speed and power. In the said sleeve 50 is a second sleeve-like member or bearing block 62 having suitable roller bearings 36 at alternate ends thereof adapted to receive the hereinbefore mentioned shaft 52. A pair of lock nuts 64 having anchor washer 66 therebetween, is provided on suitable threads 65 on the shaft 52 for rigidly locking the said bearings in place. A sleeve 68 abutting the inner race of the bearing 36 is provided adjacent the ends of the said shaft 52 and is turnable therewith. A suitable cutter 70 attached by the conventional means including the nut 72 is provided abutting the said sleeve 68 and turnable with the shaft 52. For illustrative purposes the cutter 70 is shown in a typical operation on a piece of stock 74.

Referring now to Figure 4 and also to Figure 2, it is noted that an arm or link 76 is rigidly secured to the bearing block 62 and projects through a suitable aperture or slot in the hereinbefore-mentioned sleeve 50. As seen in Figure 2 the said arm 76 terminates with a sleeve 78 having its bore threaded. An end threaded shaft 80 having a suitable collar 82 abutting the said gear box 28, is provided with a handle 84 for driving the said bearing blocks and therefore the cutter in a vertical direction. A pair of flanges 86 (only one of which is shown) is provided having a plurality of apertures 88 therein adapted to receive two bolts 90 therethrough for clamping the said arm 76 between the abovementioned clamps in frictional engagement therewith after the desired adjustment to the cutter is made.

The operation of the device is as follows. The invention is secured to the cross feed of a lathe and thereby the adjustments inherent in the cross feed mechanism are at the disposal of the instant invention. The power unit, preferably an electric motor, is energized and the worm 48 is driven through the appropriate sprocket chain and gear. The proper speed and power may then be selected by shifting the gear ratio within the gear box as hereinbefore described and the cutter is then ready to perform one of its diversified field of cutting operations. If a fine adjustment of the cutter is required the handle 84 is turned in a proper direction moving the bearing block 62 and, therefore, the cutter 70 vertically. When the exact cutter adjustment is made the bolts 90 are slipped into the apertures 88 and tightened thereby rigidly clamping the fine adjustment means in place.

While there has been described a preferred embodiment of the instant invention it will be apparent to those skilled in the art that various changes including omissions and additions may be made herein without departing from the spirit of the invention and accordingly, limitation is desired only as to the scope of the appended claims.

Having thus described the instant invention, what is claimed as novel and improved is as follows:

1. A milling machine attachment for lathes comprising a stand adapted to be secured to a lathe carriage assembly, a power unit on said stand, a gear box secured to said stand and means for transmitting force from said power unit to the gears in said gear box, a sleeve secured to said gear box and a power shaft projecting from said gear box through said sleeve, a slot in said sleeve and a bearing block in the bore of said sleeve for mounting said shaft therein, a link secured to said bearing block and projecting through said aperture and means threadingly received in said link for adjusting said bearing block, whereby vertical adjustment of the said power shaft is effected upon manipulation of said last means.

2. In a device of the character described, a stand adapted to be secured to a lathe carriage assembly, a gear box on said stand and a transmission mounted in said gear box, power means secured on said stand for driving said transmission, a tool holding shaft depending from said gear box and a sleeve therearound, a bearing block in said sleeve encircling said shaft and a collar on said shaft and abutting said bearing block, means secured to said bearing block for adjusting said tool holding shaft vertically.

DEWEY S. JONES.
SAMUEL P. JONES.

REFERENCES CITED

The following references are of record in the file of this patent:

UNITED STATES PATENTS

| Number | Name | Date |
|---|---|---|
| 1,144,744 | Wheeler | June 19, 1915 |
| 2,178,130 | Zwick | Oct. 31, 1939 |
| 2,304,779 | Curtis | Dec. 15, 1942 |
| 2,386,461 | Hellman | Oct. 9, 1945 |